(12) United States Patent
Lee

(10) Patent No.: US 6,573,934 B1
(45) Date of Patent: Jun. 3, 2003

(54) APPARATUS AND METHOD FOR DIGITAL CORRECTION OF NON-LINEARITY USING A PIECEWISE LINEAR APPROXIMATION TECHNIQUE

(75) Inventor: Je-suk Lee, Suwon (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/205,545

(22) Filed: Dec. 3, 1998

(30) Foreign Application Priority Data

Dec. 29, 1997 (KR) ......................................... 1997-75831

(51) Int. Cl.$^7$ ............................. H04N 5/202; G03F 3/08
(52) U.S. Cl. ..................... 348/254; 348/674; 358/519
(58) Field of Search .................................. 348/254, 674, 348/241, 242, 255, 256, 671, 672, 675, 676, 677; 358/519

(56) References Cited

U.S. PATENT DOCUMENTS

| | | | | |
|---|---|---|---|---|
| 5,083,198 A | * | 1/1992 | Haferl et al. | 348/675 |
| 5,175,621 A | * | 12/1992 | Maesato | 348/676 |
| 5,313,301 A | * | 5/1994 | Lee | 348/674 |
| 5,473,373 A | * | 12/1995 | Hwung et al. | 348/674 |
| 5,534,948 A | * | 7/1996 | Baldwin | 348/675 |
| 5,585,846 A | * | 12/1996 | Kim | 348/254 |
| 5,710,594 A | * | 1/1998 | Kim | 348/254 |
| 5,745,172 A | * | 4/1998 | Miyashita | 348/241 |
| 5,818,521 A | * | 10/1998 | Hieda | 348/254 |
| 5,900,918 A | * | 5/1999 | White | 348/674 |
| 6,141,047 A | * | 10/2000 | Kawai et al. | 348/254 |
| 6,166,781 A | * | 12/2000 | Kwak et al. | 348/674 |
| 6,433,823 B1 | * | 8/2002 | Nakamura et al. | 348/254 |

* cited by examiner

*Primary Examiner*—Wendy R. Garber
*Assistant Examiner*—John M. Villecco
(74) *Attorney, Agent, or Firm*—Mills & Onello, LLP

(57) ABSTRACT

Digital correction of non-linearity using a piecewise linear approximation method generates uniform errors of minimal magnitude regardless of the size of an input signal. The non-linear curve is partitioned into a number of sections which are increased over conventional techniques, without increasing the number of function values, or the amount of hardware required. A non-linear curve is divided into a first direct line and a second direct line using a piecewise linear approximation method. A third direct line links two points spaced to either side of an inflection point at the intersection of the first and second direct lines by a predetermined distance. The slope of the third direct line corresponds to the average of the slopes of the first and second direct lines. When an input x lies in the section of the third direct line, a corrected signal according to the third direct line is generated. When the input x is between a predetermined point of the first or second direct lines and the starting point of the third direct line, a corrected signal according to the first or second direct lines is generated.

17 Claims, 4 Drawing Sheets

APPARATUS AND METHOD FOR DIGITAL CORRECTION OF NON-LINEARITY USING A PIECEWISE LINEAR APPROXIMATION TECHNIQUE

BACKGROUND OF THE INVENTION

There are various types of non-linear systems employed in contemporary electronics. For example, picture display devices such as video cameras or television monitors used in image processing systems have transfer functions which are expressed by the exponential function of gamma (γ) and are therefore non-linear.

FIG. 1 is a graph depicting the non-linearity of a typical picture display device. The horizontal axis denotes the intensity of an image input (x) to the picture display device, and the vertical axis denotes the intensity of an image output (y) from the picture display device. The picture display device is characterized by a non-linearity which deteriorates visual sensitivity by displaying a dark portion of an input image signal (x) as darker (i.e. the intensity is lowered for low values of (x)) and a bright portion as brighter (i.e. the intensity is raised for large values of (x)) as shown in curve (a). Therefore, to ensure a linear final image output (y) as shown in curve (b), the input image signal (x) is first gamma-corrected by applying the exponential function $x^{1/\gamma}$ to the input signal, as shown in curve (c) and by providing the gamma-corrected signal to the picture display device. This technique is referred to in the art as non-linear correction.

Conventional non-linearity correcting methods are now described, with reference to the gamma correction application. In the case of an ideal image processing system, the gamma value is determined by the type of picture display device, for example by the fluorescent material characteristics of the cathode ray tube employed in the device. However, in an actual image processing system, it is necessary to transform the gamma value so that it accurately reflects not only the cathode ray tube, but also additional components of the system. The transformation can be implemented by analog or digital means.

In the conventional technique of gamma (γ) correction by the analog transformation method, the gamma-corrected curve (c) of FIG. 1 is partitioned into several sections, and an amplifier is configured for varying the gain in each section. The gain of each amplifier is adjusted by a piecewise linear approximation method. However, in the analog method, external adjustment ports are required in order to vary the gain. Also, there are inherent limitations in the degree to which the slope of the gamma-corrected curve can be varied.

In a digital image processing system, digital correction is preferred. However, application of piecewise linear approximation to a digital input signal is hardware-intensive, as a multiplier, a divider, an adder, and a subtracter are required. Therefore, a digital look-up table is commonly employed. However, in the look-up table method, it is impossible to implement an arbitrarily-varied gamma-corrected curve such as curve (c) of FIG. 1. Though several varied gamma-corrected curves can be preset and stored in order to address this problem, this solution is again hardware-intensive, as a large memory space is needed.

A conventional technique for addressing this problem is described in Korean Patent laid-open No. P96-036536 under the title "A digital non-linear gain controller for an arbitrarily variable image signal", by the applicant, dated Oct. 28, 1996, incorporated herein by reference. For addressing the limitations of the digital look-up table method described above, the x axis of the graph in which the gamma-corrected curve is plotted and divided into sections expressed by powers of 2. The first order function of the gamma-corrected curve is generated using a piecewise linear approximation in each section. A corrected signal (y) is obtained by applying the image signal (x) to the first order function. The gamma-corrected curve is freely transformed by varying the first order function by adjusting various predetermined parameters $Y_0-Y_5$ or $Y_0'-Y_5'$ corresponding to the starting and ending points of the respective sections.

FIG. 2 is a graph depicting the problem of the conventional non-linear gain controlling method. The horizontal axis denotes the intensity of a corrected signal (y'), representing a gamma-corrected image input and is provided to the picture display device. The vertical axis denotes the intensity of an image (y) output from the picture display device.

Referring to FIG. 2, when an ideal gamma correction is performed, the image (y) output from the picture display device is the same as the original image input (x), such that the transfer function of the picture display device is represented by an ideal curve 10 whose slope is '1', as a result of gamma correction. However, in the conventional non-linearity gain controlling method, where gamma correction is performed using piecewise linear approximation, in the output of the cathode ray tube of the picture display device there is a deviation from the ideal curve 10, for function values between the starting and ending points, e.g. points 16, 18 of the respective sections (referred to as "inflection points"), as shown in curve 12 of FIG. 2. In particular, since errors near the middle portion of each section 15, 17 are larger and more numerous than those near the inflection points (14 and 16, 16 and 18, or 18 and 20), the image of parts having errors near the inflection points is displayed more outstandingly relative to the image of parts having errors near the middle portion of each section.

In order to address this problem, it is possible to reduce the magnitude of the error between the actual curve 12 and the ideal curve 10 by increasing the number of sections. However, as the number of sections is increased, so is the number of function values corresponding to the respective sections of the gamma-corrected curve, leading again to a more inconvenient and more hardware-intensive solution.

SUMMARY OF THE INVENTION

The present invention relates to a non-linear system having a non-linear transfer function, and more particularly, to an apparatus and method for digitally correcting the non-linearity of a non-linear system, using a piecewise linear approximation technique.

To address the above problems, it is an object of the present invention to provide a method and apparatus for digital correction of non-linearity in a system transfer function using a piecewise linear approximation method adapted for minimizing and uniformly correcting errors, while minimizing the size of associated hardware and the number of function values.

Accordingly, the present invention is directed to a method for processing an n-bit wide digital input signal x to generate a corrected output signal y for transmission to a system for compensating for system non-linearity. The range of possible digital values of the digital input signal is divided into a plurality of sections, the range of each section being represented by $2^k-2^{k-1}$ where $p<k \leq n$ and p is an integer greater than or equal to 1. Next, it is determined whether the value of the input signal is less than $2^k+g$ and greater than or equal to $2^k-g$ where g is a variable less than $2^{k-1}$, and if so, a corresponding corrected output signal y' is obtained according to the following relationship:

$$y' = \frac{\{Y(k+1) - Y(k-1) + Y(k) - Y(k-1)\}}{4\{X(k) - X(k-1)\}} \cdot \{x - X(k) + g\} + Y(k) - g \cdot \frac{Y(k) - Y(k-1)}{X(k) - X(k-1)}$$

where $X(k)=2^k$ and $X(k-1)=2^{k-1}$ respectively, and where $Y(k+1)$, $Y(k)$, and $Y(k-1)$ represent function values corresponding to input values $2^{k-1}$, $2^k$, and $2^{k-1}$, respectively. If the above is not true, it is determined whether the value of the input signal is less than $2^k-g$ and greater than or equal to $2^{k-1}+g'$, where g' is less than $2^{k-2}$, and if so, a corresponding corrected output signal y' is obtained according to the following relationship:

$$y' = \frac{Y(k) - Y(k-1)}{X(k) - X(k-1)} \{x - X(k)\} + Y(k).$$

In a preferred embodiment, if the value of the input signal is less than $2^k-g$ and greater than or equal to $2^{k-1}+g'$, then the corrected signal y' may alternatively be obtained according to the following relationship:

$$y' = \frac{Y(k) - Y(k-1)}{X(k) - X(k-1)} \{x - X(k-1)\} + Y(k-1).$$

In a preferred embodiment g preferably represents:

$$g = \frac{2^k - 2^{k-1}}{4}$$

and g' preferably represents:

$$g' = \frac{2^{k-1} - 2^{k-2}}{4}$$

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 3:
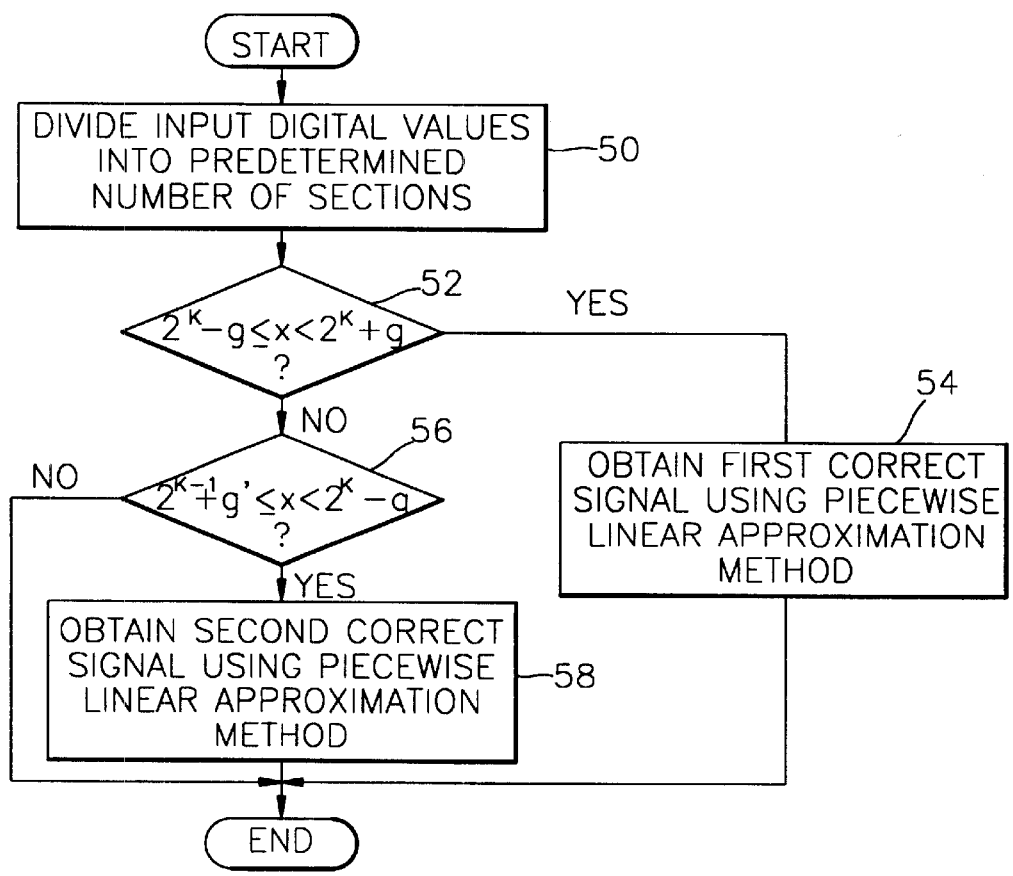
FIG. 3 is a flow diagram of a method for digital correction of non-linearity using the piecewise linear approximation method according to the present invention.

FIG. 3 is a flow diagram of a method for digital correction of non-linearity in a system transfer function employing piecewise linear approximation according to the present invention.

The method includes the steps of dividing a range of digital values known to be included in the input signal into a predetermined number of sections (step 50) and obtaining corrected signals according to the section to which the digital value of an input image signal is included, among the divided sections (steps 52–58).

Figure 4:
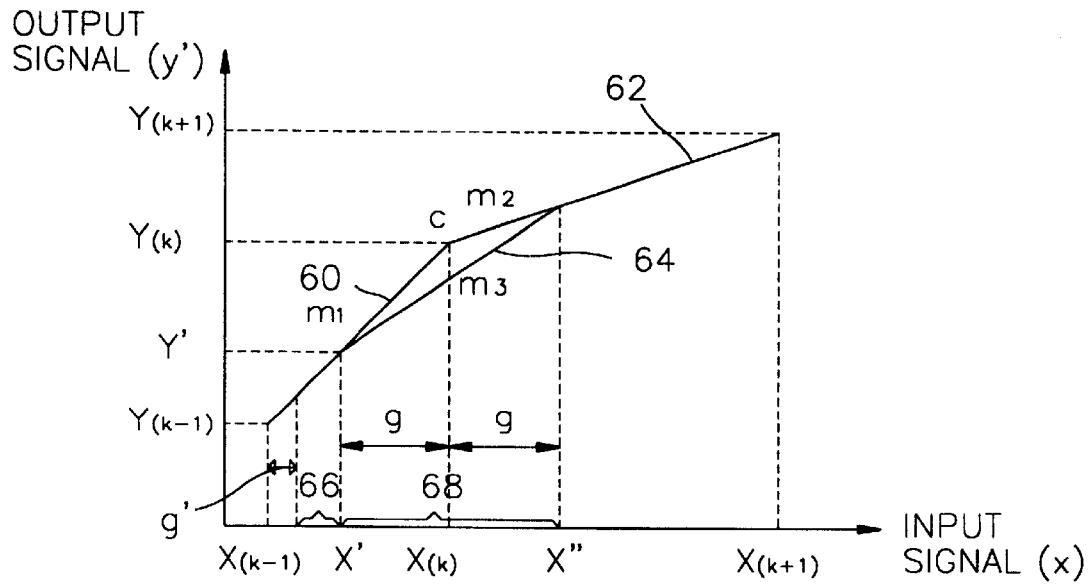
FIG. 4 is a graph for describing the technique for correcting non-linearity according to the present invention.

FIG. 4 is a graph for describing the non-linearity correction method of the present invention. The horizontal axis denotes a value, e.g. intensity, of an input signal (x). The vertical axis denotes a corrected signal (y') to be provided to a non-linear system, e.g. an image processing system.

Figure 1:
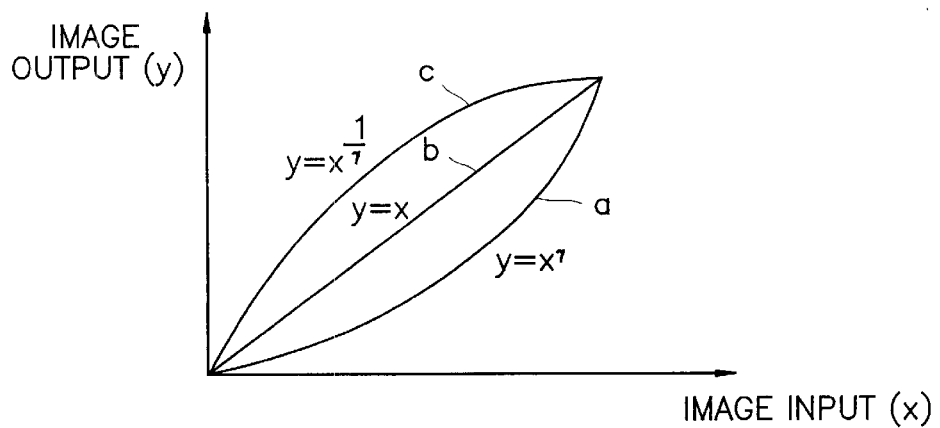
FIG. 1 is a graph for describing the non-linear behavior of a picture display device.

Referring to FIGS. 3 and 4, assume that the input signal (x) can be represented by $2^n$ digital values over its range of intensities. Assume further that such a signal is applied to a non-linear system having a non-linear transfer function as shown in FIG. 1(a). The $2^n$ digital values are partitioned into a predetermined number of sections, the range of each section being $2^k-2^{k-1}$, where $p<k\leq n$, and p is an integer not less than 1 (step 50).

The method of dividing the sections in step 50 is now described in detail as follows. In this technique, non-linear curve represented by a multiple-order function is divided or partitioned into a number of sections and the non-linear curve in each section is replaced by a linear curve.

Figure 5:
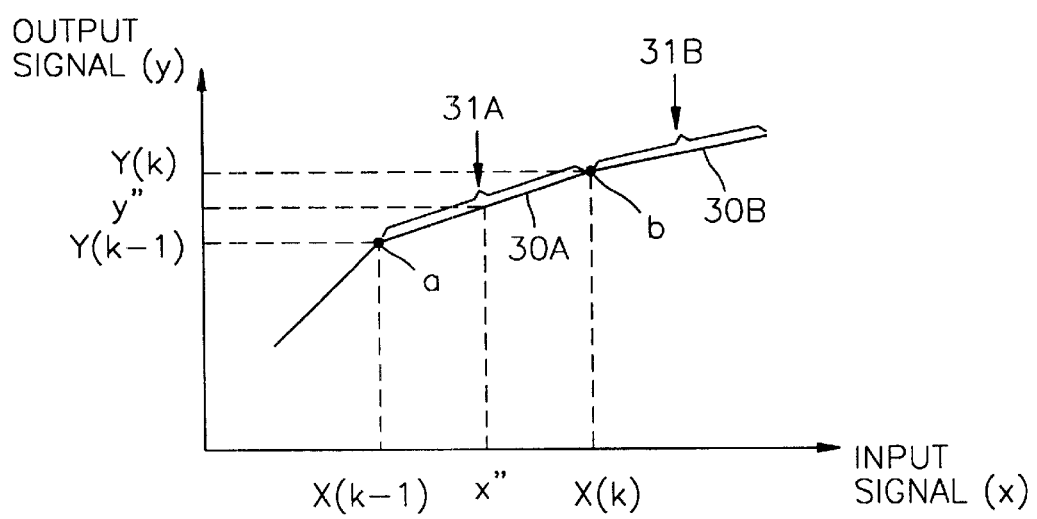
FIG. 5 is a graph for describing piecewise linear approximation, in accordance with the present invention.

FIG. 5 is a graph describing the piecewise linear approximation method. As an example, the curve 30 of FIG. 5 is obtained by dividing the gamma-corrected curve (c) of FIG. 1 into various sections 31A, 31B and replacing each of sections 31A and 31B with a linear function 30 using piecewise linear approximation. A first-order function of the replaced linear curve can be readily obtained in an arbitrary section when two points a and b, defining the bounds of the section 31A, are given. Namely, the first order function can be obtained using the data values of starting value [X(k-1)] and ending value [X(k)] of the section, and their corresponding function values [Y(k-1) and Y(k)]. The function value y" of the linear curve 30 corresponding to an arbitrary input x" falling within the section is obtained by equation 1 as follows:

$$y'' = \frac{Y(k) - Y(k-1)}{X(k) - X(k-1)} \{x'' - X(k-1)\} + Y(k-1), \text{ or} \quad (1)$$

$$y'' = \frac{Y(k) - Y(k-1)}{X(k) - X(k-1)} \{x'' - X(k)\} + Y(k)$$

In order to realize the functionality of equation 1 in terms of hardware, various multipliers, dividers, adders, and subtracters are required. Accordingly, hardware becomes more sophisticated, and therefore more expensive. In order to address this issue, the non-linear curve in the portion of the curve in which the digital value of the input signal (x) is relatively large is replaced by a linear curve. Since $1/\gamma$, which is the exponential multiplier of the non-linear curve shown in FIG. 1(c), is less than 1, the variance of the output signal (y) is moderate as the value of the input signal (x) shown in FIG. 5 increases. Accordingly, the probability of generating errors decreases. Therefore, in the present invention, the relative sizes of the respective sections obtained by dividing the horizontal axis shown in FIG. 5 are made to be different, for example, the size of each section is made to be a power of 2. When the size of each section is a power of 2, a denominator [X(k)–X(k–1)] corresponding to the size of the section in equation 1 likewise becomes a power of 2. Therefore, the dividing operation of the slope in equation 1 can be simply performed by shifting binary bits in the digitally-represented value:

$$2^k - 2^{k-1} = 2^{k-1} \quad (2)$$

and therefore the division by X(k)–X(k–1) in equation 1 is replaced by shift, the number of shifts being (k–1).

In FIG. 5, the input signal (x") is represented as:

$$[X(k-1)=2^{k-1}] \leq x'' < [X(k)=2^k] \quad (3)$$

Since the value of the input signal (x) is never less than the starting value or point [X(k–1)] of the section, and since the starting point of the section is $2^{k-1}$, the value x"–X(k–1) from equation 1 can be obtained by resetting the (k–1)th bit of the input signal (x"). For example, assuming a 10-bit (k=10) input signal (x") having a decimal value of "262" and a binary equivalent of "0100000111" a '1' first appears at the 9th bit, counting from the most significant bit. Therefore, X(k)–X(k–1) becomes "0100000000", and x"–X(k–1) becomes "0000000111" obtained by resetting the 9th bit to '0'.

Namely, in the above-mentioned piecewise linear approximation method, the horizontal axis shown in FIG. 5 is preferably divided into sections represented by powers of 2.

Following step 50, it is determined whether the digital value of the input signal (x) is less than $2^k+g$ and greater than or equal to $2^k-g$, where g is a variable less than $2^{k-1}$ (step 52 of FIG. 3).

When the digital value of the input signal (x) is less than $2^k+g$ and greater than or equal to $2^k-g$, it lies within section 68 shown in FIG. 4, a first corrected signal y' is obtained according to the following relationship (step 54 of FIG. 3):

$$y' = \frac{\{Y(k+1) - Y(k-1) + Y(k) - Y(k-1)\}}{4\{X(k) - X(k-1)\}} \cdot \{x - X(k) + g\} + \quad (4)$$

$$Y(k) - g \cdot \frac{Y(k) - Y(k-1)}{X(k) - X(k-1)}$$

wherein, X(k) and X(k–1) are function values corresponding to $2^k$ and $2^{k-1}$, respectively, and Y(k+1), Y(k), and Y(k–1) are the corrected function values corresponding to input values $2^{k+1}$, $2^k$, and $2^{k-1}$, respectively.

However, when the value of the digital input signal (x) is less than $2^k-g$ or greater than $2^k+g$, namely, it does not lie within section 68, it is next determined whether the value of the digital input signal (x) is less than $2^k-g$ and greater than or equal to $2^{k-1}+g'$ (where g' is a variable less than $2^{k-2}$), namely, it lies within section 66 shown in FIG. 4 (step 56 of FIG. 3). If this is the case, a second corrected signal (y') is obtained by the following relationship (step 58 of FIG. 3):

$$y' = \frac{Y(k) - Y(k-1)}{X(k) - X(k-1)} \{x - X(k-1)\} + Y(k-1) \text{ or} \quad (5)$$

$$y' = \frac{Y(k) - Y(k-1)}{X(k) - X(k-1)} \{x - X(k)\} + Y(k)$$

Corrected signals (y') obtained in steps 54 and 58 of FIG. 3 are provided to the non-linear system, replacing the digital input signal (x). Accordingly, the transfer function of the non-linear system is made to behave with linearity.

The above-mentioned steps 52 through 58 are now described in detail as follows.

When non-linear behavior is corrected by the conventional non-linear gain control method, errors are generated on the left and right sides of an inflection point (c) in which first and second direct lines $m_1$ 60 and $m_2$ 62 meet, as shown in FIG. 4, and the error is maximized in the center portion of the section 68. Therefore, in the non-linear correction method according to the present invention, a third direct line $m_3$ 64, the slope of which is the average of the slopes of the first and second direct lines $m_1$ 60 and $m_2$ 62 and which links two points on the first and second direct lines 60, 62, is generated near the inflection point c. According to the present invention, when the input signal (x) value lies in section 68 having the third direct line $m_3$ 64, the first corrected signal y' is obtained by substituting input signal (x) for the first order function, expressed by equation 4, on the third direct line 64. When the input signal x lies in the section 66 between X(k–1)+g', separated from the starting point [X(k–1)] of the first direct line 60 by a predetermined distance g', and the starting point [X'] of the third direct line 64, the second corrected signal is obtained by substituting input signal (x) for the first order function, expressed by equation 5, on the first direct line 60.

The aforementioned method is further applicable to the correction of signals with respect to the digital input signal (x) existing between the starting point [X(k+1)] of a fourth direct line (not shown) adjacent to the right side of the second direct line 62, and the ending point X" of the third direct line 64. Namely, it is possible to obtain corrected signals with respect to the digital input signal x between X" and X(k+1), as in the above-mentioned method, by preparing a fifth direct line (not shown) between the second direct line 62 and the fourth direct line (not shown), in the same manner as the third direct line 64 is located between the first direct line 60 and the second direct line 62.

A linear function with respect to the first direct line $m_1$ 60 shown in FIG. 4 is expressed in equation 1. A linear function y with respect to the second direct line $m_2$ 62 is shown in the following equation 6.

$$y = \frac{Y(k+1) - Y(k)}{X(k+1) - X(k)} \{x - X(k)\} + Y(k) \quad (6)$$

The slope $s_3$ of the third direct line $m_3$ 64, which is the average of the slopes $s_1$ and $s_2$ of the first and second direct lines 60 and 62 as described above, is obtained by the following relationship:

$$s_3 = \frac{s_1 + s_2}{2} = \frac{\frac{Y(k) - Y(k-1)}{X(k) - X(K-1)} + \frac{Y(k+1) - Y(k)}{X(k+1) - X(k)}}{2} \quad (7)$$

Equation 7 can be simplified to the following equation 9 by employing the principles of the piecewise linear approximation method, as described above:

$$X(k+1) - X(k) = 2^{k+1} - 2^k = 2*(2^k - 2^{k-1}) = 2\{X(k) - X(k-1)\} \quad (8)$$

Therefore, equation 7 simplifies to:

$$s_3 = \frac{Y(k) - Y(k-1)}{2\{X(k) - X(k-1)\}} + \frac{Y(k+1) - Y(k)}{4\{X(k) - X(k-1)\}} \quad (9)$$

-continued $$= \frac{\{[Y(k+1) - Y(k)] + 2 \cdot [Y(k) - Y(k-1)]\}}{4\{X(k) - X(k-1)\}}$$

A linear function y' with respect to the third direct line $m_3$ 64 having the slope $s_3$ is obtained by:

$$y' = s_3 \cdot \{x - X(k) + g\} + Y(k) - s_1 * g \quad (10)$$

$$= \frac{\{Y(k+1) - Y(k-1) + Y(k) - Y(k-1)\}}{4\{X(k) - X(k-1)\}} \cdot$$

$$\{x - X(k) + g\} - g \frac{Y(k) - Y(k-1)}{X(k) - X(k-1)} + Y(k)$$

wherein it is noted that the equation 10 and equation 4 are the sane. Since an ideal value $g_1$ of a variable g which makes the error proximal to the inflection point c most similar to that in the middle of the section is $$\frac{X(k) - X(k-1)}{4}$$

and an ideal value $g_1'$ of a variable g' is $$\frac{X(k-1) - X(k-2)}{4},$$

then equation 10 is further simplified as:

$$y' = \frac{\{Y(k+1) - Y(k-1) + Y(k) - Y(k-1)\}}{4\{X(k) - X(k-1)\}} \cdot \quad (11)$$

$$\left\{x - X(k) + \frac{X(k) - X(k-1)}{4}\right\} - \frac{Y(k) - Y(k-1)}{4} + Y(k)$$

Namely, equation 11 represents the relationship for data values along the third direct line 64 extracted by defining distances between the inflection point c and one point on the first direct line 60 and between the inflection point c and one point on the second direct line 62 to be a fraction, for example ¼, of the length [X(k)–X(k–1)] of the section.

Figure 2:
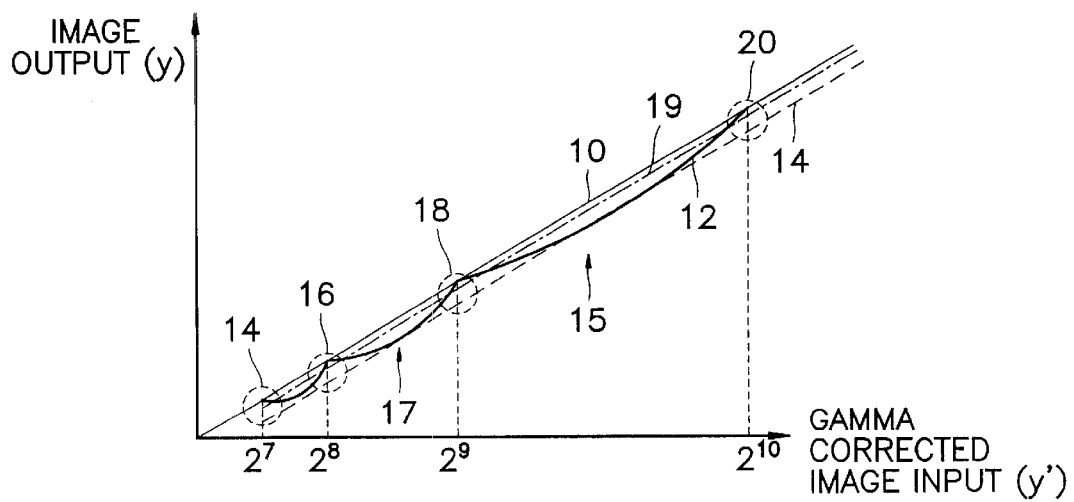
FIG. 2 is a graph for describing the limitations of a conventional non-linear gain control method.

In the non-linear correction method of the present invention, the error at the inflection point c is made similar to error in the middle portions of the section by adding the third direct line $m_3$ 64 between the first direct line $m_1$ 60 and the second direct line $m_2$ 62, so that the outstandingly displayed parts can be mitigated and/or eliminated. Namely, when the corrected signal y' obtained by the non-linearity correction method according to the present invention is input to the nonlinear system, a curve 14 as shown in FIG. 2 can be obtained that more closely approximates a linear transfer function, as compared to conventional techniques. A certain amount of error between the curve 14 of the transfer function of the non-linear system according to the present invention and the ideal curve 10 may still exist. However, when appropriate function values [Y(k+1), Y(k), Y(k–1)] are selected to have slightly higher values than the ideal non-linear curve (c) of FIG. 1, namely, slightly larger than $(2^{k+1})^{1/\gamma}$, $(2^k)^{1/\gamma}$ and $(2^{k-1})^{1/\gamma}$, respectively, the improved curve 19 shown in FIG. 2 will more closely approximate the ideal linear function 10.

Figure 6:
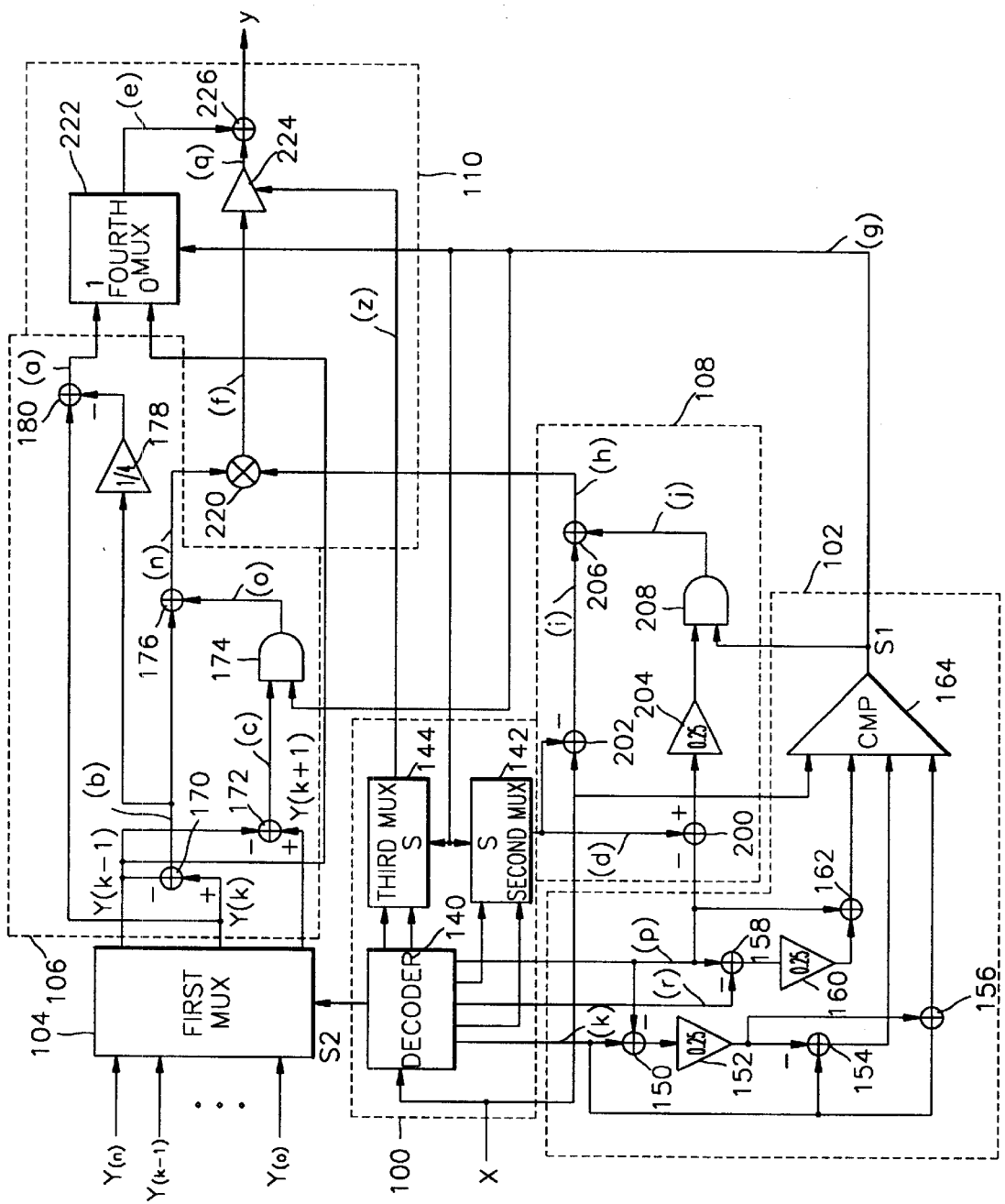
FIG. 6 is a circuit diagram of a preferred embodiment of a non-linearity correction apparatus according to the present invention.

FIG. 6 is a circuit diagram of a preferred embodiment of the non-linearity correction apparatus according to the present invention suitable for non-linear correction according to the technique described above. The apparatus includes a signification signal generator 100, a section detector 102, a first multiplexer (MUX) 104, and first, second and third operators 106, 108, and 110.

The signification signal generator 100 decodes the digital input signal (x), detects the largest signification $2^k$ of the value of the digital signal (x) among n significations, and further detects $2^{k-1}$ adjacent to $2^k$, $2^{k-2}$ adjacent to $2^{k-1}$, k+1, and k–1, and selectively outputs the detected values in response to a first select signal S1, and outputs a second select signal S2 corresponding to the detected values to the first MUX 104. The signification signal generator 100 is comprised of a decoder 140 and second and third MUXs 142 and 144.

The decoder 140 decodes the digital input signal (x), detects the largest signification, $2^k$, detects $2^{k-1}$ and $2^{k-2}$ using the detected $2^k$, detects k+1 and k–1, and outputs the second select signal S2 corresponding to the detected values. The second MUX 142 selects one of the $2^k$ and $2^{k-1}$ signals output from the decoder 140 in response to the first select signal S1, and outputs a selected signal (d) to the second operator 108. Namely, the second MUX 142 selects X(k), represented by $2^k$ in section 68, and X(k–1) represented by $2^{k-1}$ in section 66, and outputs the selected value. The third MUX 144 selects one among k–1 and k+1 output from the decoder 140 in response to the first select signal S1 and outputs the selected signal (z) to the third operator 110. Namely, the third MUX 144 selects k+1 in section 68 and k–1 in section 66 and outputs the selected value.

The section detector 102 performs the steps 52 and 56 of FIG. 3, described above. Namely, when the input digital signal (x) has a value that falls within section 68 shown in FIG. 4, a first select signal (g) is output at a "high" logic level. When the signal is located in section 66, the first select signal is output at a "low" logic level. To perform this function, the section detector 102 is comprised of adders 156 and 162, subtracters 150, 154, and 158, amplifiers 152 and 160, and a comparator 164.

The subtracter 150 subtracts X(k–1) (reference letter (p)) represented by $2^{k-1}$, from X(k) (reference letter (k)) represented by $2^k$, both generated by the decoder 140, and outputs the subtraction result to the amplifier 152. The amplifier 152 amplifies the output of the subtracter 150 "q" times (q is a positive fraction and is ¼ when $g=g_1$, as mentioned above) and outputs the result. The subtracter 154 subtracts the output $g_1$ of the amplifier 152 from X(k) and outputs the subtraction result x(k)–$g_1$ to the comparator 164. The adder 156 adds X(k) to the output $g_1$ of the amplifier 152 and outputs the addition result x(k)+$g_1$ to the comparator 164. The subtracter 158 subtracts X(k–2) (reference letter (r)), represented by $2^{k-2}$, from X(k–1) (reference letter (p)), which is $2^{k-1}$, and outputs the subtraction result. The amplifier 160 amplifies the output of the subtracter 158 "q" times and outputs the result. The adder 162 adds X(k–1) (reference letter (p)) to the output $g_1'$ of the amplifier 160 and outputs the addition result x(k–1)+$g_1'$ to the comparator 164. The comparator 164 determines whether: (1) the digital input signal (x) lies in a first section 68, in which case the comparator outputs the first select signal (g) as a "high" logic level when the value of the digital input signal (x) is less than x(k)+$g_1$ and greater than or equal to x(k)–$g_1$, or (2) the digital input signal (x) lies within a second section 66, in which case the comparator outputs the first select signal (g) at a "low" logic level when the value of the digital input signal (x) is less than x(k)–$g_1$, or greater than or equal to x(k–1)+$g_1'$.

The first MUX 104 shown in FIG. 6 selectively outputs the function values Y(k+1), Y(k), and Y(k–1), which are the corrected signals corresponding to $2^{k+1}$, $2^k$ and $2^{k-1}$, among $2^n$ corrected signals corresponding to the $2^n$ possible digital values of the digital input signal (x), to the first operator 106 in response to the second select signal S2. The functions Y(k), Y(k−1), . . . , and Y(0) can be set to values larger than the ideal gamma-corrected curve as mentioned above.

The first operator 106 generates the first and second values A1 and A2 (reference letters (a) and (n)) represented as:

$$A1 = Y(k) - g \cdot \frac{Y(k) - Y(k-1)}{X(k) - X(k-1)} \quad (12)$$

$$A2 = Y(k) - 2 \cdot Y(k-1) + Y(k+1) \quad (13)$$

in response to the function values Y(k+1), Y(k), and Y(k−1) input from the first MUX 104, input values X(k) and X(k−1) input from the signification signal generator 100, and the first select signal S1 input from the section detector 102, and outputs the result. Therefore, the first operator 106 can be realized differently from the circuit shown in FIG. 6.

When the variable g corresponds to the ideal value $g_1$ as described above, the first operator 106 is comprised of subtracters 170, 172, and 180, an adder 176, an AND gate 174, and an amplifier 178, as shown in FIG. 6. Subtracter 170 performs the subtraction of Y(k−1) from Y(k) output from the first MUX 104 and outputs the subtraction result (reference letter (b)). The amplifier 178 amplifies the output of the subtracter 170 a predetermined "q" times and outputs the amplification result. Subtracter 172 subtracts values Y(k−1) from Y(k+1), output from the first MUX 104, and outputs the subtraction result (reference letter (c)) to the AND gate 174. The AND gate 174 performs an AND operation on the value (c) output from the subtracter 172 and the first select signal S1 and outputs the AND operation result (reference letter (o)) to the adder 176. Adder 176 adds the value (reference letter (b)) output from the subtracter 170 to the value (o) output from the AND gate 174 and outputs the sum (reference letter (n)) as the value A2 represented in equation 13. Subtracter 180 subtracts the value output from the amplifier 178 from the value Y(k) output from the first MUX 104 and outputs the difference (reference letter (a)) to the third operator 110 as the value A1.

The second operator 108 generates the value A3 represented by:

$$A3 = x - X(k) + g, \text{ or } A3 = x - X(k-1) \quad (14)$$

from the digital input signal (x), and $2^k$ and $2^{k-1}$ input from the signification signal generator 100, in response to the first select signal S1, and outputs the result (reference letter (h)). When the variable g corresponds to the above-mentioned ideal value $g_1$, the second operator 108 is comprised of an adder 206, subtracters 200 and 202, an amplifier 204, and an AND gate 208. Subtracter 202 subtracts the output (d) of the second MUX 142 from the digital input signal (x) and outputs the subtraction result (i). Subtracter 200 subtracts X(k−1) (p) from the output (d) of the second MUX 142 and outputs the subtraction result. The amplifier 204 amplifies the output of subtracter 200 "q" times and outputs the amplification result. The AND gate 208 performs an AND operation on the output of the amplifier 204 and the first select signal S1 and outputs the AND operation result (j) to the adder 206. The adder 206 adds the output (i) of the subtracter 202 to the output (j) of the AND gate and outputs the addition result (h) as the value A3 of equation 14.

The third operator 110 generates corrected signal y' represented by equations 4 and 5 above, for correcting the non-linearity, from the values A1, A2, and A3 and Y(k−1) in response to the first select signal S1, k+1 or k−1 output from the third MUX 144, and outputs the result as the corrected signal y'.

The third operator 110 is comprised of a multiplier 220, a fourth MUX 222, a shifter 224, and an adder 226. The multiplier 220 multiplies the value A2 (n) output from the first operator 106 with the value A3 (h) output from the second operator 108 and outputs the multiplication result (reference letter (f)). The shifter 224 shifts the output of the multiplier 220, according to k+1 or k−1 output from the third MUX 144. The fourth MUX 222 selectively outputs one of the values A1 (a) input from the first operator 106 and Y(k−1) input from the first MUX 104 in response to the first select signal S1. Namely, the fourth MUX 222 selects and outputs the value A1 in section 68 and Y(k−1) in section 66. The adder 226 adds the result shifted in the shifter 224 to the value selected from the fourth MUX 222 and outputs the addition result as the corrected signal y'.

When the variables g and g' are set to the above mentioned ideal variables $g_1$ and $g_1'$, in order to facilitate understanding of the operation of the non-linear correcting apparatus shown in FIG. 6, the values output from the respective elements are shown as follows. The following values (d)–(j), (n), (o), (q), and (z) are representative of input values corresponding to section 68 of FIG. 4:

$$(d) = X(k) \quad (15)$$

$$(e) = Y(k) - \frac{Y(k) - Y(k-1)}{4}$$

$$(f) = \{Y(k) - 2Y(k-1) + Y(k+1)\} \cdot \left\{x - X(k) + \frac{X(k) - X(k-1)}{4}\right\}$$

$$(g) = 1$$

$$(h) = x - X(k) + \frac{X(k) - X(k-1)}{4}$$

$$(i) = x - X(k)$$

$$(j) = \frac{X(k) - X(k-1)}{4}$$

$$(n) = Y(k) - 2Y(k-1) + Y(k+1)$$

$$(o) = Y(k+1) - Y(k-1)$$

$$(q) = \frac{Y(k+1) - Y(k-1) + Y(k) - Y(k-1)}{4\{X(k) - X(k-1)\}} \cdot \left\{x - X(k) + \frac{X(k) - X(k-1)}{4}\right\}$$

$$(z) = k+1$$

The following values are representative of input values corresponding to section 66 of FIG. 4:

$$(d) = X(k-1) \quad (16)$$

$$(e) = Y(k-1)$$

$$(f) = \{Y(k) - Y(k-1)\} \cdot \{x - X(k-1)\}$$

(g)=0

(h)=x−X(k−1)

(i)=x−X(k−1)

(j)=0

(n)=Y(k)−Y(k−1)

(o)=0

$$(q) = \frac{Y(k) - Y(k-1)}{X(k) - X(k-1)} \cdot \{x - X(k-1)\}$$

(z)=k−1

The following values (a), (b), (c), (k), (l), (m), (p), and (r) apply to input values corresponding to both section 66 and 68:

$$(a) = Y(k) - \frac{Y(k) - Y(k-1)}{4} \qquad (17)$$

(b)=Y(k)−Y(k−1)

(c)=Y(k+1)−Y(k−1)

(k)=X(k)

$$(l) = \frac{X(k-1)}{4} - X(k)$$

$$(m) = \frac{X(k-1)}{4} + X(k)$$

(p)=X(k−1)

(r)=X(k−2)

In the method and apparatus for correction of non-linearity according to the present invention, the error at the inflection point is made similar to that in the central portion of the section by introducing a new linear curve $m_3$ 64 in the region of the inflection point.

The present invention is applicable to any non-linear system, including, for example, the application of gamma correction of a picture display device.

In the method and apparatus for digitally correction of non-linearity using the piecewise linear approximation method according to the present invention, the number of sections in the non-linear curve are doubled using small function values with a modest increase in hardware, thus making gamma correction uniform over the entire range of digital input values. It is possible to more precisely correct the non-linearity of the non-linear system by setting the function values to be larger than the values of the ideal curve.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method for processing an n-bit-wide digital input signal x to generate a corrected output signal y for transmission to a system for compensating for system non-linearity comprising:

dividing the range of digital values of the digital input signal x into a plurality of sections, the range of each section being represented by $2^k$–$2^{k-1}$ where p<k≦n and p is an integer greater than or equal to 1;

determining whether the value of the input signal is less than $2^k$+g and greater than or equal to $2^k$−g, where g is less than $2^{k-1}$, and if so, obtaining a corresponding corrected output signal y' according to the following relationship:

$$y' = \frac{\{Y(k+1) - Y(k-1) + Y(k) - Y(k-1)\}}{4\{X(k) - X(k-1)\}} \cdot \{x - X(k) + g\} + Y(k) - g \cdot \frac{Y(k) - Y(k-1)}{X(k) - X(k-1)}$$

where X(k)=$2^k$ and X(k−1)=$2^{k-1}$ respectively, and where Y(k+1), Y(k), and Y(k−1) represent function values corresponding to input values $2^{k+1}$, $2^k$, and $2^{k-1}$, respectively; and determining whether the value of the input signal is less than $2^k$−g and greater than or equal to $2^{k-1}$+g', where g' is less than $2^{k-2}$, and if so, obtaining a corresponding corrected output signal y' according to the following relationship:

$$y' = \frac{Y(k) - Y(k-1)}{X(k) - X(k-1)} \{x - X(k)\} + Y(k).$$

2. The method of claim 1, wherein, if the value of the input signal is less than $2^k$−g and greater than or equal to $2^{k-1}$+g', then the corrected signal y' is obtained according to the following relationship:

$$y' = \frac{Y(k) - Y(k-1)}{X(k) - X(k-1)} \{x - X(k-1)\} + Y(k-1).$$

3. The method of claim 1, wherein:

$$g = \frac{2^k - 2^{k-1}}{4}.$$

4. The method of claim 1, wherein:

$$g' = \frac{2^{k-1} - 2^{k-2}}{4}.$$

5. The method of claim 1, wherein the function values Y(k+1), Y(k), and Y(k−1) are greater than $(2^{k+1})^{1/\gamma}$, $(2^k)^{1/\gamma}$, and $(2^{k-1})^{1/\gamma}$, respectively.

6. The method of claim 1, wherein the non-linearity correction is gamma correction.

7. An apparatus for processing an n-bit wide digital input signal x to generate a corrected output signal y for transmission to a system for compensating for system non-linearity comprising:

means for dividing the range of digital values of the digital input signal x into a plurality of sections, the range of each section being represented by $2^k$–$2^{k-1}$ where p<k≦n and p is an integer greater than or equal to 1;

means for determining whether the value of the input signal is less than $2^k$+g and greater than or equal to $2^k$−g, where g is less than $2^{k-1}$, and if so, obtaining a corresponding corrected output signal y' according to the following relationship:

$$y' = \frac{\{Y(k+1) - Y(k-1) + Y(k) - Y(k-1)\}}{4\{X(k) - X(k-1)\}} \cdot \{x - X(k) + g\} + Y(k) - g \cdot \frac{Y(k) - Y(k-1)}{X(k) - X(k-1)}$$

where $X(k)=2^k$ and $X(k-1)=2^{k-1}$ respectively, and where $Y(k+1)$, $Y(k)$, and $Y(k-1)$ represent function values corresponding to input values $2^{k+1}$, $2^k$, and $2^{k-1}$, respectively; and means for determining whether the value of the input signal is less than $2^k-g$ and greater than or equal to $2^{k-1}+g'$, where g' is less than $2^{k-2}$, and if so, obtaining a corresponding corrected output signal y' according to the following relationship:

$$y' = \frac{Y(k) - Y(k-1)}{X(k) - X(k-1)} \{x - X(k)\} + Y(k).$$

8. The apparatus of claim 7, wherein if the value of the input signal is less than $2^k-g$ and greater than or equal to $2^{k-1}+g'$, then the corrected signal y' is obtained according to the following relationship:

$$y' = \frac{Y(k) - Y(k-1)}{X(k) - X(k-1)} \{x - X(k-1)\} + Y(k-1).$$

9. The apparatus of claim 7, wherein $$g = \frac{2^k - 2^{k-1}}{4}.$$

10. The apparatus of claim 7, wherein $$g' = \frac{2^{k-1} - 2^{k-2}}{4}.$$

11. The apparatus of claim 7, wherein the function values $Y(k+1)$, $Y(k)$, and $Y(k-1)$ are greater than $(2^{k+1})^{1/\gamma}$, $(2^k)^{1/\gamma}$, and, $(2^{k-1})^{1/\gamma}$, respectively.

12. The apparatus of claim 7, wherein:
the means for dividing the range of a digital input signal x into the sections comprises a significant ion signal generator for decoding the digital input signal, for determining $2^k$ from the decoded input signal, and for determining the values of $2^{k-1}$, $2^{k-2}$, k+1, and k−1 based on $2^k$, selectively outputting the determined value in response to a first select signal, and outputting a second select signal corresponding to the determined values;
the means for determining the value of the input signal comprises a section detector for comparing the input signal with respect to $2^k+g$, $2^k-g$, and $2^{k-1}+g'$ where g is less than $2^{k-1}$ and g' is less than $2^{k-2}$, detecting a corresponding section for the digital input signal in response to the companion result, and outputting the first select signal indicating the detected section; and further comprising:
a first MUX for selectively outputting function values $Y(k+1)$, $Y(k)$, and $Y(k-1)$ corresponding respectively to $2^{k+1}$, $2^k$, and $2^{k-1}$ in response to the second select signal;
a first operator for generating first and second values A1 and A2 according to the function values input from the first MUX and $2^k$ and $2^{k-1}$ input from the signification signal generator, in response to the first select signal input from the section detector, and outputting the generated results, where $$A1 = Y(k) - g \cdot \frac{Y(k) - Y(k-1)}{X(k) - X(k-1)}, \text{ and}$$

$A2=Y(k)-2\cdot Y(k-1)+Y(k+1)$;

a second operator for generating a third value (A3) according to the input signal and $2^k$ and $2^{k-1}$ input from the signification signal generator, in response to the first select signal, and outputting the generated result, where A3=x−X(k)+g or A3=x−X(k−1), depending on the section of the input signal, and where X(k) and X(k−1) respectively represent $2^{k-1}$ and $2^{k-1}$; and
a third operator for generating the corrected signal y' as a function of A1, A2, A3, and Y(k−1), in response to the first select signal, k+1, and k−1, and outputting the generated result.

13. The apparatus of claim 12, wherein the third operator comprises:
a first multiplier for multiplying the A2 and A3 values and outputting the multiplication result;
a shifter for shifting the output of the first multiplier according to k+1 or k−1;
a second MUX for selecting either A1 or Y(k−1) in response to the first select signal; and
a first adder for adding the shift result to the signal selected by the second MUX and outputting the addition result as the correct signal y'.

14. The apparatus of claim 13, wherein the first operator comprises:
a first subtracter for subtracting Y(k−1) from Y(k) and outputting the subtraction result;
a first amplifier for amplifying the output of the first subtracter;
a second subtracter for subtracting the output of the first amplifier from Y(k) and outputting the subtraction result as the value A1;
a third subtracter for subtracting Y(k−1) from Y(k+1) and outputting the subtraction result;
a first AND operator for performing an AND operation on the output of the third subtracter and the first select signal; and
a second adder for adding the output of the first AND operator to the output of the first subtracter and outputting the addition result as the value A2.

15. The apparatus of claim 14, wherein the second operator comprises:
a fourth subtracter for subtracting $2^k$ and $2^{k-1}$ output from the signification signal generator from the input signal x, and outputting the subtraction result;
a fifth subtracter for subtracting $2^{k-1}$ from $2^k$ and $2^{k-1}$ output from the signification signal generator, and outputting the subtraction result;
a second amplifier for amplifying the output of the fifth subtracter and outputting the amplification result;
a second AND operator for performing an AND operation on the output of the second amplifier and the first select signal, and outputting the AND operation result; and
a third adder for adding the output of the second AND operator to the output of the fourth subtracter, and outputting the addition result as the value A3.

16. The apparatus of claim 15, wherein the section detector comprises:
- a sixth subtracter for subtracting $2^{k-1}$ from $2^k$ and outputting the subtraction result;
- a seventh subtracter for subtracting $2^{k-2}$ from $2^{k-1}$ and outputting the subtraction result;
- a third amplifier for amplifying the output of the sixth subtracter "q" times and outputting the amplification result;
- a fourth amplifier for amplifying the output of the seventh subtracter and outputting the amplification result;
- an eighth subtracter for subtracting the output of the third amplifier from $2^k$ and outputting the subtraction result;
- a fourth adder for adding the output of the third amplifier to $2^k$ and outputting the addition result;
- a fifth adder for adding the output of the fourth amplifier to $2^{k-1}$ and outputting the addition result; and
- a comparator for comparing the output of the fourth, fifth, and eighth subtracters with the digital signal x and outputting the comparison result as the first select signal.

17. The apparatus of claim 12, wherein the signification signal generator comprises:
- a decoder for decoding the digital signal (x), detecting $2^k$, $2^{k-1}$, $2^{k-2}$, k+1, and k−1, where $2^k$ is the largest signification, and outputting a second select signal corresponding to the detected values;
- a third MUX for selectively outputting one among $2^k$ and $2^{k-1}$ detected by the decoder, in response to the first select signal; and
- a fourth MUX for selectively outputting one among k−1 and k+1 detected by the decoder, in response to the first select signal.

* * * * *

UNITED STATES PATENT AND TRADEMARK OFFICE
CERTIFICATE OF CORRECTION

PATENT NO.     : 6,573,934 B1
DATED          : June 3, 2003
INVENTOR(S)    : Je-suk Lee It is certified that error appears in the above-identified patent and that said Letters Patent is hereby corrected as shown below:

<u>Column 13,</u>
Line 42, delete "apparat us" and insert -- apparatus --.

Signed and Sealed this

Second Day of September, 2003

JAMES E. ROGAN
*Director of the United States Patent and Trademark Office*